United States Patent [19]
Wang

[11] 3,926,681
[45] Dec. 16, 1975

[54] TYPE R AND S THERMOCOUPLE SYSTEMS HAVING COPPER-NICKEL-MANGANESE WIRE AS PLATINUM COMPENSATING LEAD WIRE

[75] Inventor: Teh Po Wang, North Caldwell, N.J.

[73] Assignee: Wilbur B. Driver Company, Newark, N.J.

[22] Filed: Dec. 10, 1973

[21] Appl. No.: 423,267

Related U.S. Application Data

[60] Continuation of Ser. No. 293,063, Sept. 28, 1972, abandoned, which is a division of Ser. No. 129,460, March 30, 1971, which is a continuation-in-part of Ser. No. 822,786, April 1, 1969, abandoned.

[52] U.S. Cl. .................. 136/241; 136/236; 75/159; 75/161
[51] Int. Cl.² ......................................... H01L 35/20
[58] Field of Search ...... 136/227, 241, 236; 75/159, 75/161, 153, 160

[56] References Cited
UNITED STATES PATENTS

| | | | |
|---|---|---|---|
| 1,468,456 | 9/1923 | Bristol | 136/241 X |
| 2,183,592 | 12/1939 | Silliman | 75/153 |
| 2,224,573 | 12/1940 | Hunter | 75/153 |
| 3,337,371 | 8/1967 | Agatonov et al. | 75/159 |
| 3,372,062 | 3/1968 | Zysk | 136/227 |

*Primary Examiner*—Benjamin R. Padgett
*Assistant Examiner*—E. A. Miller
*Attorney, Agent, or Firm*—Norman J. O'Malley; Donald R. Castle; John C. Fox

[57] ABSTRACT

A thermocouple lead wire composition comprising, as expressed in percent by weight, nickel 0.5 percent – 1.5 percent; manganese 0.25 percent – 0.4 percent; balance copper.

A pair of thermocouple lead wires, one wire having the above composition, the other wire being composed essentially of copper, exhibit a differential electromotive force substantially equal to the electromotive force developed by a thermocouple using noble metals principally of platinum between 32°F to 400°F.

1 Claim, 2 Drawing Figures

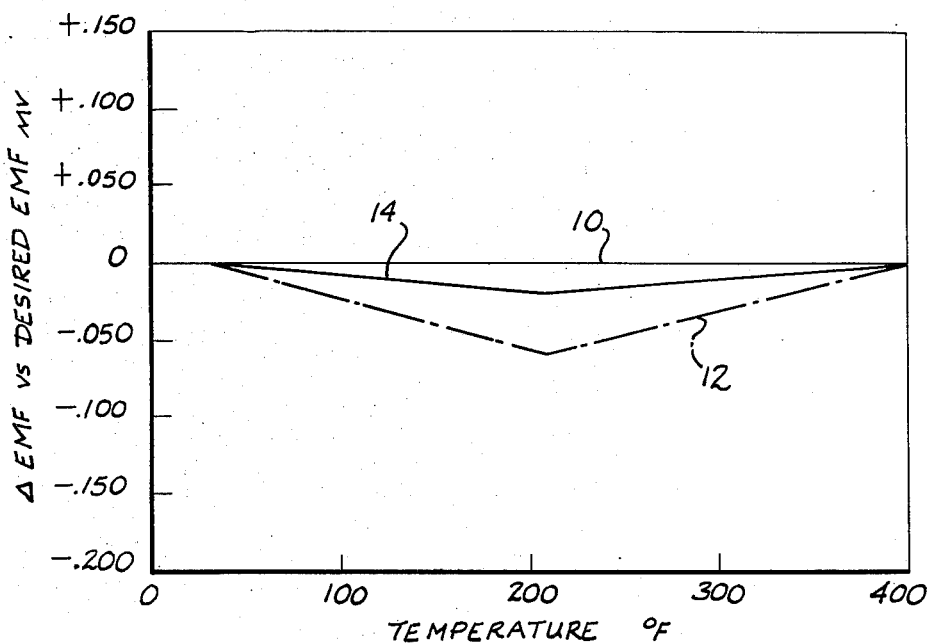
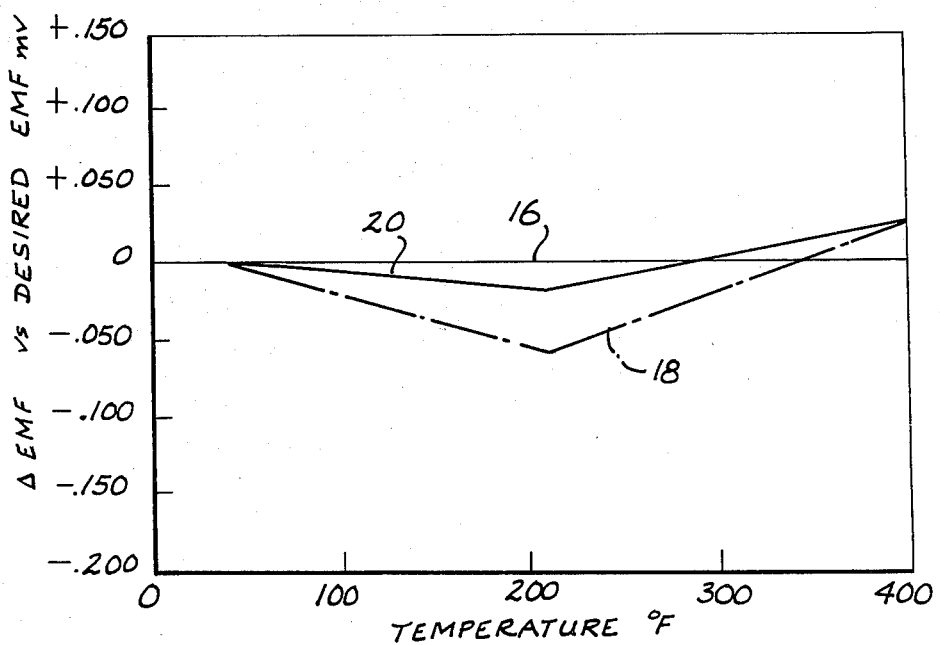

TYPE R AND S THERMOCOUPLE SYSTEMS HAVING COPPER-NICKEL-MANGANESE WIRE AS PLATINUM COMPENSATING LEAD WIRE

CROSS REFERENCE TO RELATED APPLICATION

This application is a continuation of copending application Ser. No. 293,063, filed Sept. 28, 1972, now abandoned which was a division of copending application Ser. No. 129,460, filed Mar. 30, 1971 which was a continuation-in-part of application Ser. No. 822,786, filed Apr. 1, 1969 and now abandoned which was assigned to the assignee of the present invention. The assignment was recorded Mar. 30, 1971, Reel 2724, Frame 639.

BACKGROUND OF THE INVENTION

Thermocouple using noble metals are commonly employed in high temperature measurement and control, particularly for temperatures of 2,000°F and higher. Typically, such thermocouples use platinum as the negative thermoelement and an alloy of platinum and rhodium as the positive thermoelement. Two different alloy compositions are normally used; the first contained 13 percent rhodium, balance platinum, and the second contains 10 percent rhodium, balance platinum. A thermocouple using platinum as the negative thermoelement together with a positive thermoelement having the first composition is known as a Type R thermocouple. When the second composition is substituted for the first composition, the resultant thermocouple is known as a Type S thermocouple.

Thermocouples are usually spaced from the measurement or control instrumentation by distances which can be six feet or more, and thus lead wires are used to connect the thermocouples to the instrumentation. Because of the high cost of platinum, these lead wires to the platinum thermocouples are composed of less expensive metals or alloys.

It is well known to use as lead wires, for both Type R and Type S thermocouples, a copper wire as the positive thermocouple extension (or lead) wire and a copper-nickel alloy wire, known as PCLW (platinum compensating lead wire) as the negative thermocouple extension wire. This last named alloy contains about 0.75 percent nickel, balance copper.

In the normal installation, the thermocouples are connected to a header junction, and the lead wires are connected between the junction and the instrumentation. In most industrial applications, the temperature of the header junction will not exceed 400°F while the temperature at the instrumentation will not fall below 32°F.

Ideally, to avoid inaccuracy, the lead wires and a noble thermocouple should have matched thermoelectric characteristics at which the differential electromotive force (EMF) developed between the two lead wires should be equal, both in polarity and magnitude, to the differential EMF developed between the two thermocouple wires at any temperature within the range 32°F to 400°F.

I have found that the use of copper-nickel alloy wire as a negative thermocouple extension wire together with a copper wire as the positive thermocouple extension wire does not provide an ideal match.

Indeed, while the above arrangement of lead wires provides a tolerable mismatch for Type R thermocouples, it provides a far less tolerable mismatch for Type S thermocouples. In U.S. Pat. No. 3,372,062 there is disclosed a pair of extension wires which match closely to the chromel-alumel Type K thermocouple. The positive extension wire is a copper base alloy having nickel and manganese therein. The alloy used as the negative extension wire of my invention is also a copper base alloy containing nickel and manganese. The EMF value of my alloy is different from that disclosed in U.S. Pat. No. 3,372,062. For example, the EMF of the previous art versus Pt 27 at 70°C is 0.036 mv. The EMF values of my alloy are 0.10 mv at 212F (100C) and 0.41 mv at 400F (204C).

In my invention, I employ a new alloy composition for the negative extension wire which, when used together with a copper wire as the positive extension, produces a much better match not only for Type S thermocouples but for Type R thermocouples as well.

SUMMARY OF THE INVENTION

In accordance with my invention, a negative thermocouple extension wire comprises, as expressed in percent by weight, 0.5 percent – 1.5 percent nickel, 0.25 percent – 0.40 percent manganese, balance copper. Small amounts of deoxidizers selected from the class consisting of boron, magnesium and silicon can be added to this composition.

The differential EMF between a copper wire used as the positive thermocouple extension wire and my negative thermocouple extension wire, as measured over the temperature range 32°F to 400°F is substantially matched with the EMF's generated by both Type S and Type R Thermocouples.

BRIEF DESCRIPTION OF THE DRAWINGS

In the drawings:

FIG. 1 is a graph showing the match between the differential EMF's of my invention and a Type R couple as a function of temperature in comparison with the existing copper-nickel alloy; and FIG. 2 is a similar graph showing the match between the differential EMF's of my invention and a Type S couple as a function of temperature in comparison with the existing copper-nickel alloy.

DETAILED DESCRIPTION OF THE PREFERRED EMBODIMENTS

My negative extension wire comprises 0.5 percent – 1.5 percent nickel, 0.25 percent – 0.40 percent manganese, balance copper. An illustrative composition is 1 percent nickel, 0.3 percent manganese, balance copper which can also contain 0.03 percent to 0.05 percent silicon, 0.02 percent to 0.04 percent magnesium or 0.01 percent boron.

It has been discovered that by keeping the manganese content within the range of from 0.25 percent to 0.40 percent that the close balance is maintained between the copper wire as a positive extension wire when these are used in conjunction with the before-described Type R and Type S thermocouples. Increasing the manganese content above the 0.25 percent to 0.40 percent range to above about 0.7 percent introduces a mismatch of the magnitude that no benefits in relationship to the copper-nickel alloy previously used. It is believed that the new copper base alloy having from 0.25 percent to 0.40 percent manganese and 0.5 percent to 1.5 percent nickel constitutes an advancement in the art. A range of from 0.75 percent to 1.25 percent of nickel is preferred.

Referring now to FIG. 1, curve 10 which is a straight horizontal line represents the ideal or zero EMF difference between a Type R thermocouple and a pair of lead wires. The dotted curve shown at 12 represents the actual match obtained when the positive lead wire is copper and the negative lead wire is 0.75 percent nickel, balance copper. The solid curve shown at 14 represents the actual match obtained in the same manner as in curve 12 with a wire having my composition substituted for the nickel-copper alloy wire described above.

FIG. 2 shows a similar group of curves. Curve 16 is a straight horizontal line representing the ideal match between a Type S thermocouple and a pair of lead wires. The dotted curve shown at 18 represents the actual match obtained where the positive lead wire is copper and the negative lead wire is 0.75 percent nickel, balance copper. The solid curve shown at 20 represents the actual match obtained in the same manner as curve 18 with a wire having my composition substituted for the nickel-copper alloy wire described above.

From FIGS. 1 and 2, it will be seen that a substantial improvement in matching is obtained through the use of my invention.

While I have described my invention with particular reference to the embodiments described above, my protection is to be limited only by the terms of the claims which follow.

What is claimed is:

1. A thermocouple system consisting essentially of a positive thermal element consisting essentially of an alloy of platinum and rhodium, a negative thermal element consisting essentially of platinum, said positive and negative thermal elements being electrically joined to form a thermocouple selected from the group consisting of Type R and Type S thermocouples, wherein the positive thermal element of said Type R thermocouple is a platinum rhodium alloy containing 13 percent rhodium, balance platinum and wherein the positive thermal element of said Type S thermocouple is a platinum rhodium alloy containing 10 percent rhodium, balance platinum, a positive lead wire consisting essentially of copper, electrically connected to said positive thermal element and a negative lead wire of an alloy consisting essentially of 0.5 percent to 1.5 percent nickel, 0.25 percent to 0.40 percent of manganese, balance copper, said negative lead wire being electrically connected to said negative thermal element.

* * * * *